No. 856,931. PATENTED JUNE 11, 1907.
R. P. WHITE.
HUSKING MACHINE.
APPLICATION FILED DEC. 9, 1905.

2 SHEETS—SHEET 1.

Witnesses
Frank P. Glow
H. C. Rodgers

Inventor:
R. P. White.
By George Y. Thorpe
Atty.

No. 856,931. PATENTED JUNE 11, 1907.
R. P. WHITE.
HUSKING MACHINE.
APPLICATION FILED DEC. 9, 1905.
2 SHEETS—SHEET 2.
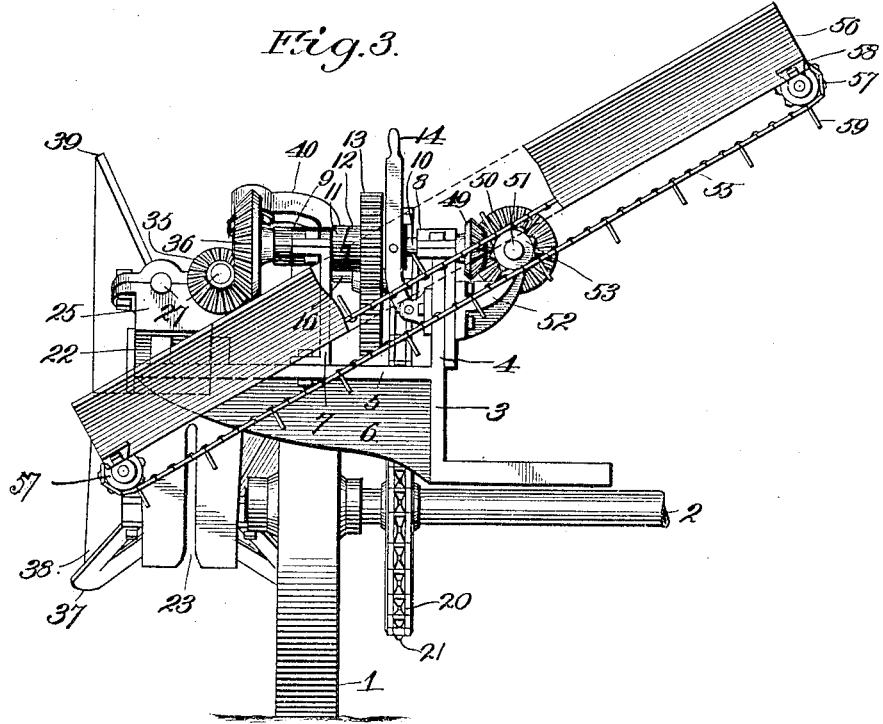
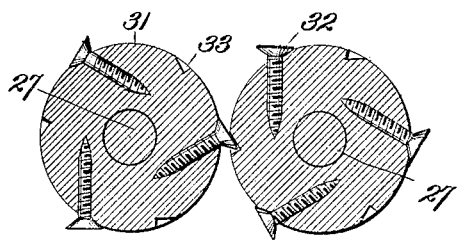
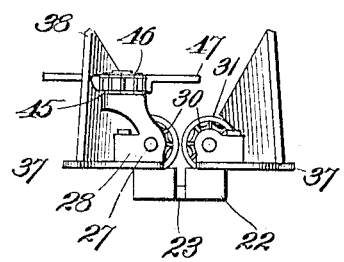
Witnesses
Frank R. Glow.
H. C. Rodgers.
Inventor:
R. P. White.
By George L. Thorpe
atty

UNITED STATES PATENT OFFICE.

RALEIGH P. WHITE, OF KANSAS CITY, MISSOURI, ASSIGNOR OF ONE-HALF TO WALLACE PRATT, JR., OF KANSAS CITY, MISSOURI.

HUSKING-MACHINE.

No. 856,931.     Specification of Letters Patent.     Patented June 11, 1907.

Application filed December 9, 1905. Serial No. 291,068.

*To all whom it may concern:*

Be it known that I, RALEIGH P. WHITE, a citizen of the United States, residing at Kansas City, in the county of Jackson and State of Missouri, have invented certain new and useful Improvements in Husking Machines, of which the following is a specification.

This invention relates to corn husking machines, and more particularly to a machine for husking standing corn of that type embodying a pair of parallel downwardly and forwardly inclined rolls to receive the corn between them and strip the ears from the stalks, and the object of the invention is to produce a husking machine which operates efficiently and reliably and at a speed proportionate to that of the travel of the machine.

With this object in view and others as hereinafter appear the invention consists in certain novel and peculiar features of construction and organization as hereinafter described and claimed; and in order that it may be fully understood reference is to be had to the accompanying drawings, in which—

Figure 1:
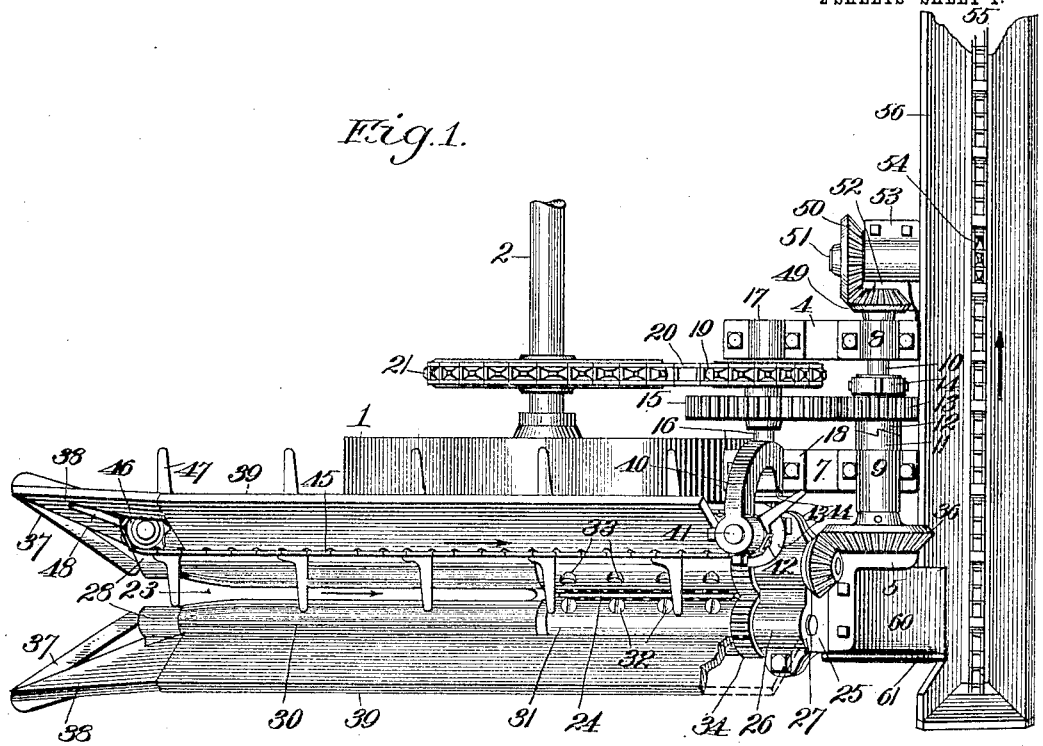
Figure 2:
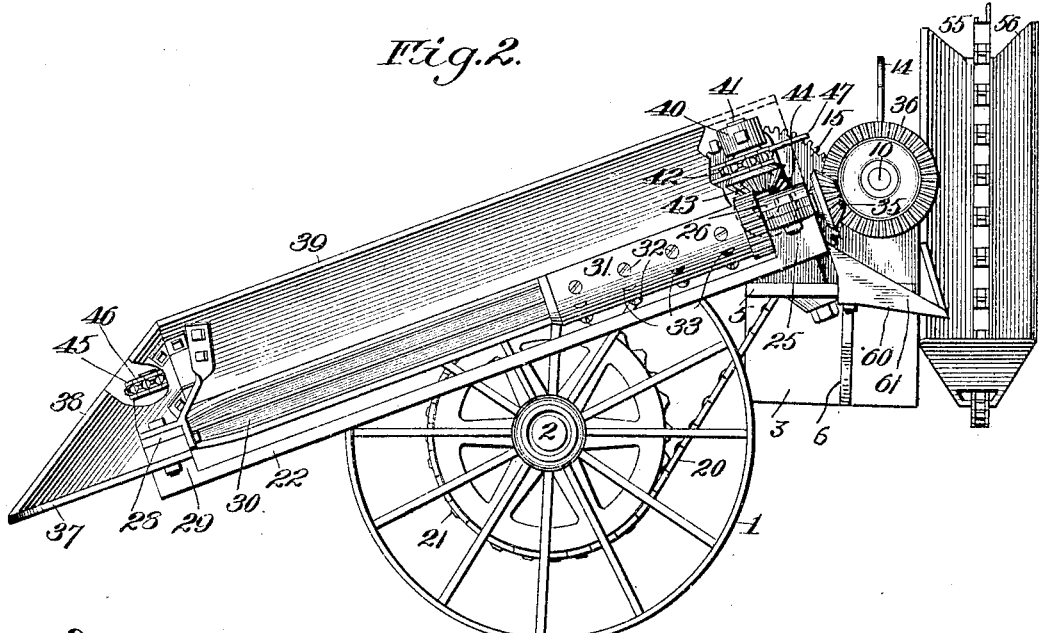

Figure 1, is a top plan view of a part of a husking machine embodying my invention. Fig. 2, is a side view of the same. Fig. 3, is a rear view with the elevator chute broken away. Fig. 4, is an enlarged cross section of the husking rolls. Fig. 5, is a front view of the snapping and husking rolls, the corn lifting plates and the endless conveyer for holding the corn stalks upright during the progress of the machine.

In the said drawings, 1 indicates one of the carrying and drive wheels of the machine and 2 the axle rotatable with said wheel.

3 is a casting supported in any suitable manner, not shown, rearward of the wheel and provided with an upwardly projecting arm 4 and an outwardly projecting arm 5 braced by rib 6. Bolted or otherwise secured to arm 5, is a bracket 7 and said arm and bracket 7 with caps 8 and 9 respectively, form bearings for the transverse shaft 10, provided with a rigid clutch section 11 adapted for engagement at times by a companion clutch section 12 journaled on shaft 10, and formed integral with a small gear wheel 13, a lever 14 suitably fulcrumed on arm 4, as shown clearly in Fig. 3, being provided to slide said clutch section 12 in or out of gear with clutch section 11, the gear wheel 13 being never wholly withdrawn by preference, from gear wheel 15, mounted on a transverse shaft 16 journaled in arm 4 and bracket 7 and caps 17 and 18 respectively secured to said arm and bracket.

19 is a sprocket wheel rigid on shaft 16 and connected by chain 20 to a drive sprocket 21 rigid on axle 2, so that the rotative movement imparted to the drive wheels as the machine is drawn over the field transmits movement at an increased speed to shaft 10, when the clutch sections 11 and 12 are in mesh, for a purpose which is hereinafter explained.

22 indicates a long cast-metal plate extending downwardly and forwardly and supported by having its rear end secured rigidly as shown or in any other suitable manner to the arm 5 of bracket 3. Said plate is bifurcated so as to provide the central longitudinal slot 23 having a flaring mouth and in line with said slot the upper part of the plate is provided with a longitudinal slot 24 for the passage of the husks as hereinafter explained.

25 indicates an upwardly projecting transverse rib at the rear end of plate 22 and providing in conjunction with cap 26, bearings for the ends of the parallel shafts 27 journaled at their lower ends in bearings 28 secured to the upwardly projecting transverse ribs 29 at the lower end of the plate 22 and at opposite sides of its bifurcation. 30 indicates a pair of parallel longitudinal fluted rolls mounted rigidly on said shafts and having their lower ends tapered by preference, and 31 indicates a pair of preferably wooden rolls secured upon shafts 27 between the fluted or stripping rolls and the upper bearings of said shafts, and said rolls 31 are each provided with series of wood screws 32 set at an angle to the radial line of the rolls so that the heads of said screws shall project at one side from the rolls while at the opposite side they will lie flush with the rolls by preference, each wooden roll being also provided with corresponding series of angular cavities or notches 33 to receive the heads of the screws of the opposite roll, these screw heads and cavities being adapted to provide means whereby the husks shall be stripped from the ears of corn lying longitudinally upon the rolls, and fed down through the underlying slot 24 whence they fall to the ground. This construction of the husking rollers, it will be noticed, provides a projection which will present a cutting edge or face to the husk as it meets the same but will present a smooth surface thereto as it recedes so that there will be no angles or sharp projections liable to engage and injure the ear. Between the upper ends of rolls 31 and the upper bearings of said shafts the latter are equipped with intermeshing gear wheels 34, and secured upon the extreme upper end of the inner shaft is a bevel gear 35 meshing with and driven by a bevel gear 36 on the outer end of shaft 10.

37 are V-shaped gathering arms secured to the ribs 29 and arranged to catch stalks inclining to the right or left and straighten them up and direct them into slot 23 and between the rolls 30, and 38 are corn-lifting plates superposed with respect to the gathering arms and having their upper edges inclined upwardly and rearwardly from the outer ends of said gathering arms, said lifting plates being adapted to coöperate with the gathering arms in raising the inclined corn to an upright position.

From the rear or upper ends of the lifting plates to about the upper ends of the husking rolls a guide chute extends which consists of a pair of downwardly projecting sides 39, one disposed above each roll for the purpose of retaining the ears of corn as they are stripped from the stalks and then husked upon said rolls.

40 indicates an arched arm cast by preference with bearing cap 18 and terminating above the inner husking roll to the rear of the corresponding side 39 of the chute and secured to said arm is a stub shaft 41 equipped with a sprocket wheel 42 and a bevel gear 43, the latter meshing with a bevel gear 44 rigidly secured on the outer end of shaft 16 in order to transmit motion from said shaft to said sprocket wheel and consequently to the longitudinally extending chain 45 connecting said sprocket wheel with the sprocket-wheel 46 journaled on an arm of the inner bearing 28, and projecting from said chain are a series of arms 47, the inner lift plate 38 having an opening 48 for the passage of said arms, said arms being also permitted to pass the arched arm 40 because of the peculiarity of the construction of the latter as shown clearly in Fig. 1.

49 indicates a bevel gear secured rigidly on the inner end of shaft 10, and meshing with a bevel gear 50 on the front end of a short shaft 51, journaled in a bearing formed conjointly by a bracket 52, and bearing cap 53, the former being bolted as shown in Fig. 3, to the arm 4 of the casting 3. Secured rigidly on the rear end of shaft 51 is a sprocket wheel 54 to drive an endless chain 55, forming the bottom of an inclined elevator chute 56, the ends of the chain engaging sprocket or other guide wheels 57, journaled in bearing brackets 58 depending from the ends of said chute, and to insure the upward movement or feed of the husked corn in the elevator composed of said chute and chain, the latter is provided with a series of arms 59.

From the foregoing description taken in connection with the drawings, it will be apparent that the movement of the machine across the field imparts movement to the conveyers in the direction indicated by the contiguous arrows Fig. 1, and that the rolls rotate downwardly and inwardly with respect to each other, the speed of chain conveyer 45 being such that its arms 47 will tend to keep the corn upright until it has reached the closed or upper end of the bifurcation 23, the rolls through their direction of rotation and their angular arrangement with respect to the ground in the meantime rolling upward on the stalk so as to snap the ears therefrom in an upward direction. By the time the progress of the machine has brought the upper end of the bifurcation contiguous to the stalk of corn engaged by the machine, the latter is permitted to slip past the engaging arm 47 of chain 45 because the latter is disposed some distance above the rolls and immediately thereafter the progress of the machine through the engagement of the closed end of the bifurcation, bends the stalk forwardly so that the machine may pass over it.

The ears of corn through the action described and because of the upward movement of the arms 47, are fed upon the husking rolls and naturally roll down upon the latter in a longitudinal position so that the husks can be gripped by the heads of one or more of the series of screws and be stripped from the ears, the latter being caused by the arms 47 to travel up past the gear wheels 34 over bearing cap 26, whence they fall upon the inclined plate 60 and roll into the lower end of the transverse elevator hereinbefore described, the latter elevating such ears and discharging them by preference into a wagon driven alongside of the machine. The inclined plate 60 by preference has an upwardly projecting flange 61 at its outer side, to guard against the ears falling off the side of said plate onto the ground instead of passing into the elevator chute.

From the above description it will be apparent that I have produced a machine for husking standing corn which embodies the features of advantage enumerated as desirable and which is obviously susceptible of modification in minor particulars without departing from the spirit and scope of the invention.

Having thus described the invention what I claim as new and desire to secure by Letters Patent, is:—

The combination of an inclined plate having a central longitudinal bifurcation in its front portion and a central longitudinal slot in its rear portion, a pair of parallel shafts mounted longitudinally on the inclined plate on opposite sides of said bifurcation and slot, stripping and husking rollers secured on said shafts, the husking rollers being arranged alongside the slot and each provided with sharp projections which engage cavities in the opposing roller over the slot in the inclined plate, divergent side plates above said shafts which extend down close to the rollers, an endless chain supported by the inclined plate and moving around one of the side plates and provided with lateral arms projecting over the bifurcation and slot in the inclined plate, and suitable operating mechanism.

In testimony whereof I affix my signature, in the presence of two witnesses.

RALEIGH P. WHITE.

Witnesses:
    H. C. RODGERS,
    G. Y. THORPE.